Oct. 18, 1966 R. N. WENDRICKS 3,279,289
METHOD AND APPARATUS FOR SEPARATING A PREFORM
INTO CONTAINER BODIES
Filed April 9, 1965 2 Sheets-Sheet 1

INVENTOR.
ROLAND NORBERT WENDRICKS
BY Leonard R. Kohan
ATTORNEY

Oct. 18, 1966　　　R. N. WENDRICKS　　　3,279,289
METHOD AND APPARATUS FOR SEPARATING A PREFORM
INTO CONTAINER BODIES
Filed April 9, 1965　　　　　　　　　　　　2 Sheets-Sheet 2
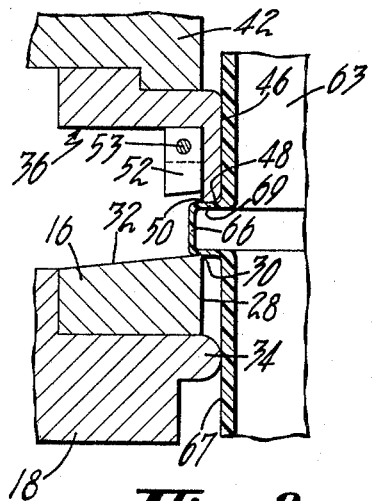
Fig. 3.
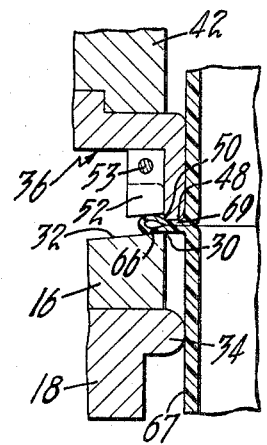
Fig. 4.
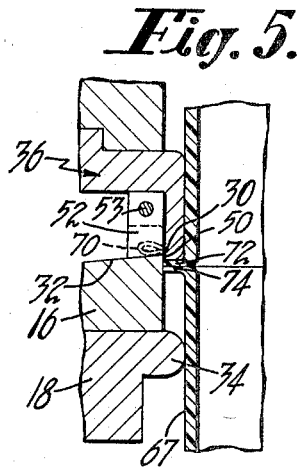
Fig. 5.
Fig. 2.
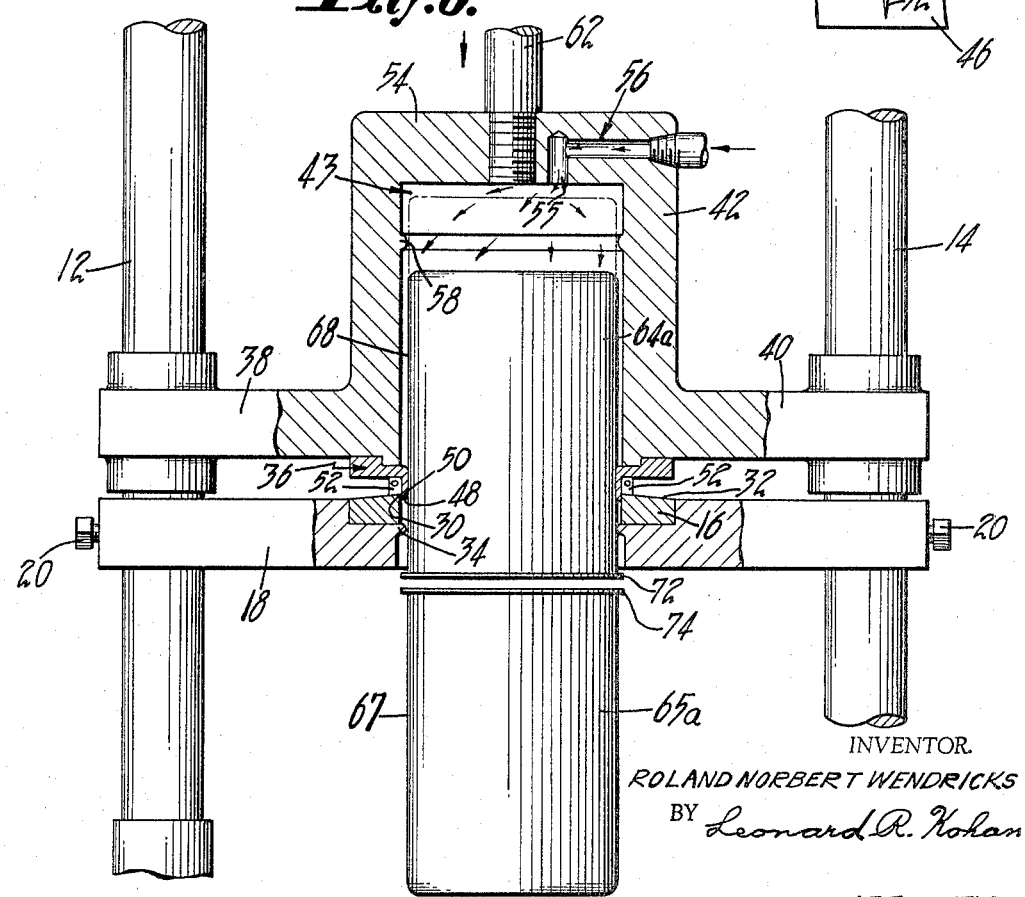
Fig. 6.
INVENTOR.
ROLAND NORBERT WENDRICKS
BY Leonard R. Kohan
ATTORNEY United States Patent Office 3,279,289
Patented Oct. 18, 1966

3,279,289
METHOD AND APPARATUS FOR SEPARATING A PREFORM INTO CONTAINER BODIES
Roland Norbert Wendricks, Barrington, Ill., assignor to American Can Company, New York, N.Y., a corporation of New Jersey
Filed Apr. 9, 1965, Ser. No. 447,038
11 Claims. (Cl. 83—19)

The present invention relates to a method and apparatus for making container bodies from a hollow tubular resilient plastic body closed at both ends. In particular, it relates to cutting along a U-shaped annular bead, located at the midpoint of a completely closed hollow cylindrical plastic preform to form two container bodies, each closed at one end and retaining a portion of the U-shaped bead, which is employed as a seaming flange when the container bodies are subsequently seamed to end closures.

The cost, inertness and formability of synthetic thermoplastic resins have drastically increased commercial employment of plastic containers. In spite of the many advantages offered by plastic, the commercial usage of plastic has been limited in certain areas because the plastic offers limited rigidity. To increase the strength of the plastic container body, a rigid end closure, usually of metal, is frequently seamed to the plastic body. Such a container construction offers the advantages of both the plastic and metallic components.

The employment of a metallic end closure and a plastic body, as container components, requires a tight metal-to-plastic seal between the metallic end closure and the plastic body. This seal is formed during the seaming operation. To consistently effect the formation of such metal-to-plastic seal, during the seaming operation, the plastic body should provide a seaming flange of substantially uniform radial length and width which insures a seal of reproducible uniformity suitable for high-speed, automated production.

It is therefore an object of the present invention to provide a method of cutting a hollow plastic preform to provide two flanged container bodies.

Another object is to provide a cutting apparatus for separating a hollow plastic preform into flanged container bodies which insures formation of a flange of uniform dimensions.

An additional object is to provide a cutting apparatus for dividing a closed hollow cylindrical plastic preform into container bodies which automatically maintains the preform in position during division.

A further object is to provide a cutting apparatus which automatically positions a closed hollow cylindrical plastic preform within the cutting apparatus prior to the division of the preform into container bodies.

Yet another object is to provide a cutting apparatus of the character described which includes an efficient means for ejecting the formed container bodies from the cutting apparatus.

Numerous other objects and advantages of the invention will be apparent as it is better understood from the following description, which, taken in conjunction with the accompanying drawings, discloses a preferred embodiment thereof.

The above objects are accomplished by providing a completely closed hollow tubular resilient plastic preform having an outwardly directed substantially U-shaped bead surrounding the longitudinal wall of the preform, disposing the bead between complementary cutting elements which surround the longitudinal wall of the preform on either side of the bead, moving the elements relatively toward one another to sever the outer extremity of the bead thereby dividing the preform into two separate pieces each having a sidewall and a bottom, thus providing two open ended containers in which the portion of the bead remaining attached forms a flange surrounding the open end, and thereafter removing the container bodies from the severing apparatus.

Referring to the drawings:

FIGURE 2 is a fragmentary view taken along the line 2—2 in FIGURE 1;

FIGURES 3–5 are enlarged section views of a punch and die, illustrating the cutting and separating of a closed hollow tubular plastic preform into two containers; and FIGURE 6 is an elevation view, partially in section, illustrating the ejection of the formed container bodies from the cutting apparatus.

Figure 1:
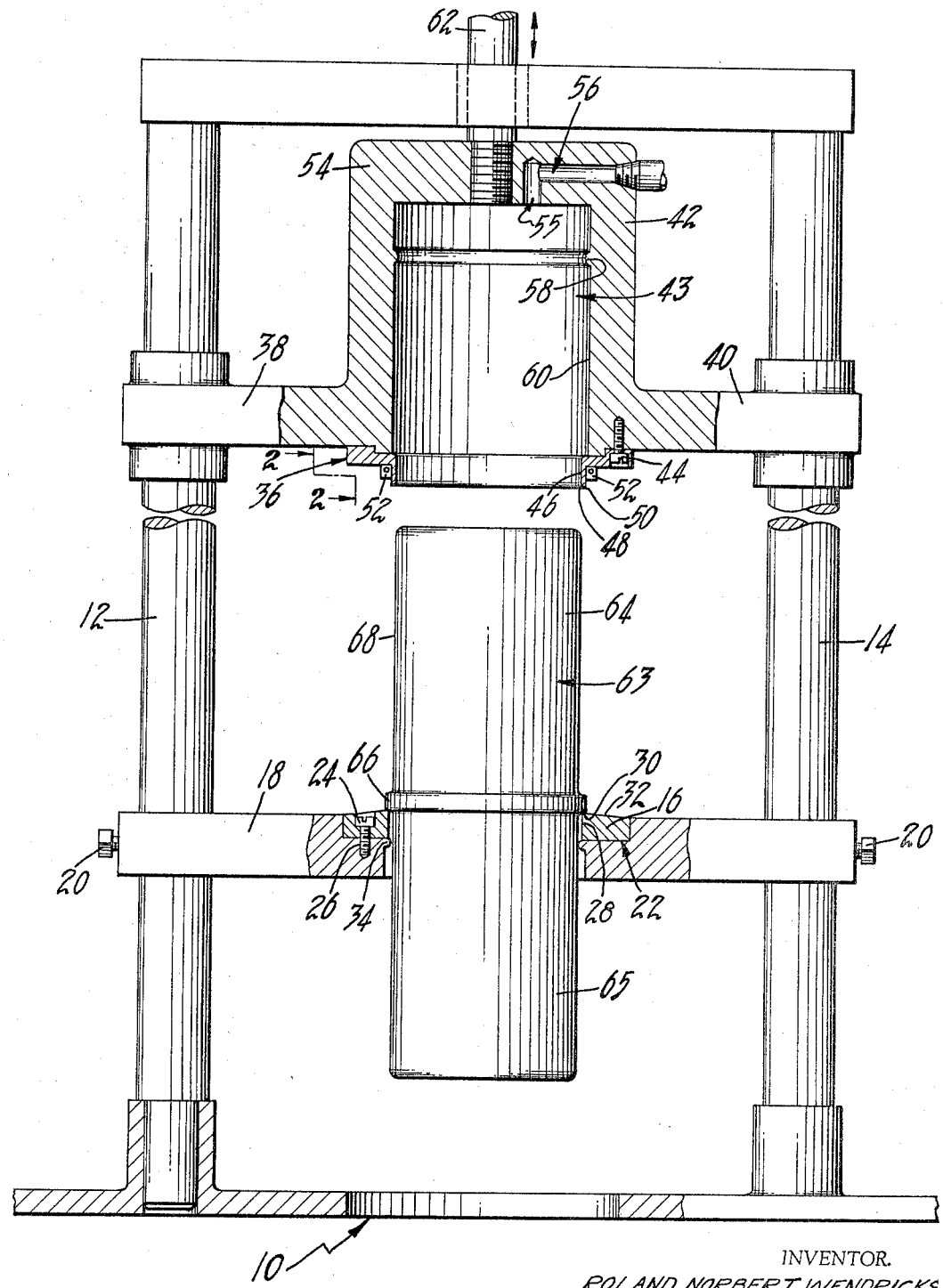
FIGURE 1 is an elevation view, particularly in section, illustrating the apparatus when a closed tubular plastic preform is positioned therewithin for division.

As a preferred or exemplary embodiment of the instant invention, FIGURE 1 illustrates a frame 10 having parallel guide rods 12 and 14 on which the hereinafter described container cutting components are mounted. An annular cutting die 16 is supported between the guide rods 12 and 14 by a support plate 18. The support plate 18 is movably secured to the guide rods 12, 14 by bolts 20 so that the die 16 may be properly positioned.

The die 16 is placed within an annular recess 22 within the support plate 18 and is secured therein by a plurality of bolts 24 through countersunk threaded holes 26. The inner diameter 28 of the die 16 has, at its upper extremity, annular cutting edge 30. The upper extremity of the cutting edge 30 merges with an inclined annular face 32 which is displaced approximately 10 degrees from a horizontal plane.

Below the annular cutting die 16 is an annular bead 34 whose inside diameter is less than that of the inner diameter 28 of the die 16. The use of the bead 34 in the cutting operation will be more fully described hereinafter.

An apertured punch, generally designated 36, is located above the die 16 and maintained in aligned relation therewith by radial arms 38 and 40 which are movably secured to rods 12 and 14 respectively. The punch 36 is secured to the lower end of a cylinder 42 having a cavity 43 by suitable means, such as plurality of bolts 44. The cylinder 42 is integral with the inner extremities of the radial arms 38, 40.

The apertured punch 36 is provided with an inner annular wall 46 which merges at its lower end with an arcuate surface 48 terminating in an annular cutting edge 50, which cooperates with the cutting edge 30 of the die 16, to effect a shearing type cutting action which will be described hereinafter. A plurality of radial knives 52 (see FIGURE 2), secured by pins 53, are positioned exterior to and above the annular cutting edge 50 in order to facilitate trimming, which is described hereinafter. These radial knives 52 may be of any desired number, although only two are shown.

The cylinder 42 has a closed upper end 54 in which is provided a port 55, at the end of an L-shaped passage 56. The passage 56 extends from the periphery of the cylinder 42 and affords communication between a source of pressure (not shown) and the interior of the cylinder 42 for the purpose of discharging formed container bodies, as will be more fully explained hereinafter. An annular bead 58 is formed along the interior surface 60 of the cylinder 42 and functions in a manner similar to the annular bead 34, as will be explained hereinafter.

To effect reciprocation of the punch 36, a rod 62 is secured to the closed end 54 of the cylinder 42. The rod 62 may be hydraulically or mechanically reciprocated by any well known actuation mechanism.

While the instant apparatus has generally utility, it is preferably employed to simultaneously form two container bodies from a completely closed elongated hollow cylindrical plastic preform 63 having an upper section 64 and a lower section 65. The hollow plastic preform is usually formed by a known blowing process in which a parison of substantially uniform cross-sectional area is expanded within a mold cavity by fluid pressure. During this blowing operation, the parison is disproportionately expanded to form a projecting U-shaped annular peripheral bead 66, circumscribing the cylindrical preform at its longitudinal center. The disproportionate expansion of the U-shaped annular bead 66 results in a reduction of approximately 50% in the wall thickness of the bead 66 to the remaining thickness of the hollow plastic preform 63. The hollow plastic preform 63 is preferably symmetrical relative to the center line of the annular bead 66. However, this is not essential to either the operation of the apparatus nor to the method of utilizing the apparatus.

In using the apparatus, the plastic preform 63 is placed within the annular cutting die 16 so that the U-shaped annular bead rests upon the cutting edge 30. In order to insure proper vertical positioning of the preform 63, the outer wall 67 of the lower section 65 is confined and held by the annular bead 34 of the die 16. The punch 36 is then forced downwardly by the rod 62 which is actuated by a mechanism (not shown) to position the preform 63 into position for the cutting operation which is shown in FIGURES 3–5. As the punch descends, the bead 58 within the cylinder 42 engages the outer wall 68 of the upper section 64 of the preform 63 in a manner similar to that of the lower bead 34 and the wall 67 in order to insure proper vertical positioning of the preform 63 during the subsequent cutting operation.

As the punch 36 approaches the die 16, the arcuate surface 48 and the cutting edge 50 come into contact with the upper wall 69 of the bead 66. Further movement of the punch 36 towards the die 16 compresses the bead 66 and positions the outer extremity of the bead upon the inclined annular face 32 of the die 16.

Continued downward movement of the punch 36 causes cooperation of the cutting edges 30, 50 to sever an outer peripheral band 70 from the bead 66 thus dividing the preform 63 into 2 separate containers 64a and 65a having symmetrical seaming flanges 72 and 74 respectively of equal dimensions (see FIGURE 6).

In order to facilitate removal of the now severed peripheral band 70 from the apparatus, this band 70 is severed into a plurality of sections simultaneously with the separation of the upper and lower section 64, 65 of the preform 63. This is done when radial knives 52 force the outer peripheral band 70 against the inclined annular face 32 of the die 16 and thereby sever the band 70 into a plurality of arcuate lengths which may then be easily removed from the apparatus. As shown here two knives 52 are utilized to separate the band 70 into two segments. It is readily apparent that any number of knives may be utilized to separate the band 70 into a plurality of pieces without departing from the spirit and scope of the invention.

It is important that the seaming flanges 72, 74 be as symmetrical and as equal as possible in order to insure the formation of a liquid tight double seam when the seaming flanges are attached to rigid closures during a subsequent automated seaming operation. With the aforementioned apparatus and method, this may be done with the minimum degree of complexity.

After separation of the preform 63 into two containers 64a and 65a, the lower container 65a generally is allowed to fall free while the upper container 64a is ejected from the cavity 43 of the cylinder 42 by means of a compressed fluid such as air which is directed through the L-shaped passage 56 and the port 55 by suitable valve means (not shown). The pressure of the compressed air is adequate to free the wall of the container 64a from its engagement with the bead 58. Although this ejection is shown to occur while the punch 36 and the die 16 are still engaged, it is readily apparent that this ejection could also be carried out after the punch 36 has been raised and separated from the die 16 such as the position shown in FIGURE 1.

It is thought that the invention and many of its attendant features will be understood from the foregoing description, and it will be apparent that various changes may be made in the form, construction, and arrangement of parts and that changes may be made in the steps of the method described and in their order of accomplishment without departing from the spirit and scope of the invention or sacrificing all of its material advantages, the form hereinbefore described being merely a preferred embodiment thereof.

I claim:
1. A method of making a flanged container body from a hollow tubular preform having a projecting peripheral hollow bead surrounding said preform, comprising:
   placing said bead between first and second cutting members of a severing apparatus;
   effecting relative movement between said first and second cutting members longitudinally of the axis of said preform;
   compressing said hollow bead as said cutting members approach each other;
   severing the outer extremity of said bead to separate said preform into two separate bodies having symmetrical flanges formed from the unsevered portion of said bead; and thereafter removing said separated bodies from said apparatus.

2. The method of claim 1 wherein only one of said cutting members is moved during the severing operation.

3. The method of claim 1 wherein the longitudinal axis of said preform is normal to the plane of at least one of said cutting elements during severing of said preform into two bodies.

4. The method of claim 1 wherein said severed outer extremity is also severed into a plurality of separate segments.

5. The method of claim 1 wherein at least one of said severed bodies is ejected from said apparatus by compressed fluid.

6. An apparatus for separating a hollow tubular preform having a projecting peripheral hollow bead surrounding said preform into two flanged container bodies, comprising:
   a first cutting member having a continuous cutting edge;
   a second cutting member having a continuous cutting edge with a concentric diameter slightly greater than that of the cutting edge of said first cutting member and positioned to cooperate with said first cutting member;
   means for moving one of said cutting members longitudinally with respect to the axis of said preform;
   and means for severing the outer extremity of said projecting bead to separate said preform into two container bodies having symmetrical and substantially equal flanges formed from the unsevered portion of said bead;

7. The apparatus of claim 6 wherein said cutting members are provided with guide surfaces to properly position said projecting bead prior to severance thereof.

8. The apparatus of claim 6 wherein a closed cylinder surrounds said preform, an end thereof and said projecting bead facilitate proper positioning during severing, and said cylinder includes means for ejecting one of said containers after severance of said bead.

9. The apparatus of claim 8 wherein said ejecting means is a compressed air system.

10. The apparatus of claim 6 including radial cutting means secured to one of said cutting members for cutting the severed portion of said projecting bead into a plurality of segments.

11. The apparatus of claim 6 wherein said first and second cutting members are annular.

No references cited.

WILLIAM W. DYER, Jr., Primary Examiner.

J. M. MEISTER, Assistant Examiner.